Nov. 10, 1953

F. L. PUTZRATH 2,658,953

MAGNETIC RECORDING ART

Filed May 4, 1951

INVENTOR
Franz L. Putzrath
BY Morris [signature]
ATTORNEY

Patented Nov. 10, 1953 2,658,953

UNITED STATES PATENT OFFICE 2,658,953

MAGNETIC RECORDING ART

Franz L. Putzrath, Pennsauken, N. J., assignor to Radio Corporation of America, a corporation of Delaware Application May 4, 1951, Serial No. 224,602

1 Claim. (Cl. 179—100.2)

Figure 1:
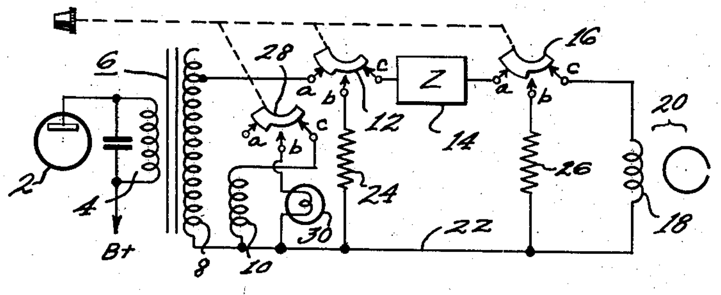

This invention relates to the art of magnetic recording, and more particularly to means for preventing a magnetic recording head from becoming permanently magnetized.

In the art of magnetic recording, it has become conventional to provide a superaudible, high frequency bias current for the recording head during the recording process. If, at the end of the recording cycle, the high frequency current is suddenly removed from the recording head, the core material of the head may become permanently magnetized. To overcome this, it is usual to permit the oscillator to gradually decrease its output by decaying through its own tank circuit. This, however, necessitates the shutting off of the oscillator.

In some situations, it has been found desirable to remove the bias current from the recording head without necessitating a shutting off of the oscillator. For example, in a motion picture projector which is adapted for use with either optical or magnetic sound-tracks, such as described in a copending application of Putzrath and Good, Ser. No. 224,294, filed May 3, 1951, the oscillator may serve a multiple purpose such as supplying the energizing current to an exciter lamp for optical playback, to a magnetic erase head, and to the record head. In such situations, it is preferable to be able to shift the output of the oscillator from one use to another without first turning off the oscillator.

Accordingly, it is an object of the present invention to provide an improved magnetic recording system.

It is another object of the present invention to provide a magnetic recording system characterized by means for deenergizing a recording head without leaving the head permanently magnetized.

A further object of this invention is to provide means as set forth which obviates the necessity of first arresting the source of energizing current.

In accomplishing these and other objects, there has been provided, in accordance with the present invention, a switching system interconnecting a source of high frequency current, such as an oscillator, to a magnetic recording head. The switches are of the type known as make-before-break switches. Several such switches are employed and ganged together whereby they are all operable from a single control member. One contact on each of the switches is connected to a load device which is adapted to be connected, by operation of the switches, in shunt with the recording head in the high frequency circuit. Although the switches are operable from a single control member, the contacts to the shunt loads are closed sequentially. Thus, the shunt load is successively increased, thereby occasioning a corresponding attenuation of the energizing flux in the core of the recording head. Continued movement of the switch members disconnects the head from the source of current after the current in the head has been sufficiently attenuated.

A better understanding of the present invention may be had from the following detailed description, when read in connection with the accompanying drawings, in which Figures 1–5 are schematic diagrams of a circuit arranged in accordance with the present invention and showing the steps involved in deenergizing the magnetic recording head.

Referring to the drawings in more particularity, there is shown, in the several figures, the output portion of an oscillator including an oscillator tube 2 and its associated inductance 4 which constitutes the primary winding of a transformer 6. The transformer is provided with a secondary winding including two windings 8 and 10. The first of these windings 8 is connected at one end to one contact (*a*) of a first multiposition switch 12 which is preferably a make-before-break switch. The common contact (*c*) of the switch 12 is connected, through a line impedance 14 which includes a conventional compensating network, to one of the contacts (*a*) of a second multiposition switch 16. The common contact (*c*) of the second multiple position switch 16 is connected to one side of the coil 18 on a magnetic recording head 20. The other side of the coil 18 is connected to a common return line 22.

A third contact (*b*) on each of the aforementioned switches is connected through a load device, represented by resistors 24 and 26, to the common return line.

One end of the second winding 10 of the transformer is connected to the common return line. The other end of the winding is connected to the common contact (*c*) of a third multiposition switch 28. The contact (*a*) of this switch is an open contact, while a third load device, represented by an exciter lamp 30, is connected between the third contact (*b*) and the common return line.

Figure 2:
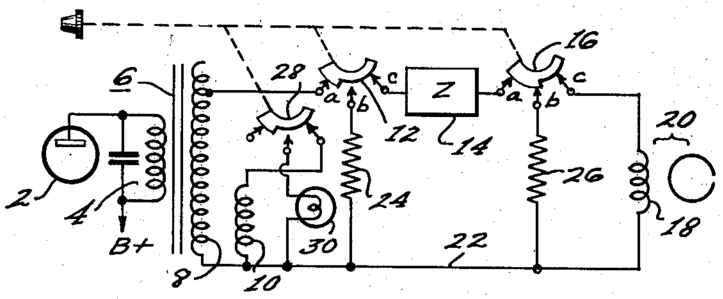

When the switches are in the position shown in Figure 1, and the oscillator is operating, the total output of the transformer is directly connected through the first two switches to the coil of the recording head. The contacts connected to all of the shunt loads are open. When, as in the earlier mentioned example, it is desired to switch from magnetic recording to optical playback, the control means of the switches is actuated. The switches are arranged so that the closing of the third contact of each switch occurs at a slightly different time. Thus, as shown in Figure 2, the third contact (*b*) of the second switch 16 closes first, and before the first contact (*a*) thereof is opened. This connects the load device (resistor) 26 in shunt, or parallel, with the coil of the recording head, reducing the bias current through the coil by the amount shunted through the load device.

Figure 3:
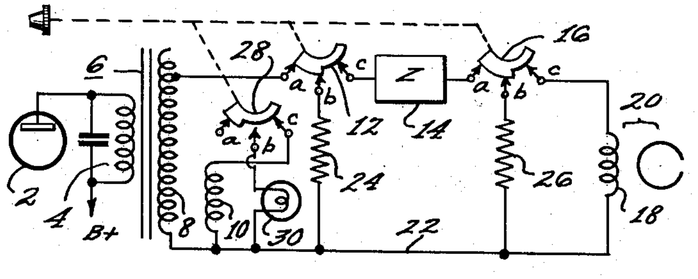

As shown in Figure 3, the third contact (*b*) of the first switch 12 is closed next, connecting the load device (resistor) 24 also in shunt with the recording head and the other load device. This further reduces the bias current flowing through the recording head coil.

Figure 4:
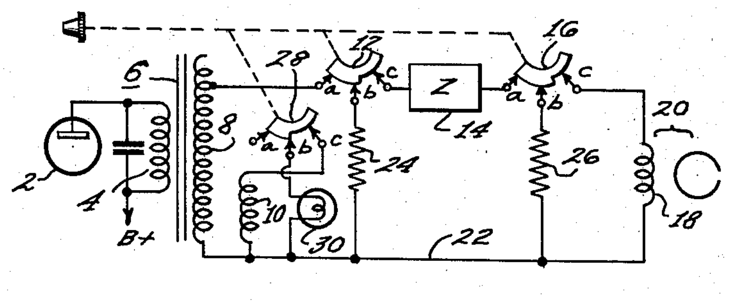

Next, as seen in Figure 4, the third contact (*b*) of the third switch 28 is closed, completing the circuit to the third load device which is shown as being an exciter lamp 30 of the optical sound system. The energization of the exciter lamp further reduces the current to the recording head. It should be noted that the circuit to the recording head is still completed through the first contacts of the first and second switches. However, after the three successive steps of attenuation, the circuit to the recording head may be opened without the danger of having the head permanently magnetized. Thus, the switches come to rest in the position shown in Figure 5, leaving the exciter lamp energized for optical playback and as a load on the oscillator.

Figure 5:
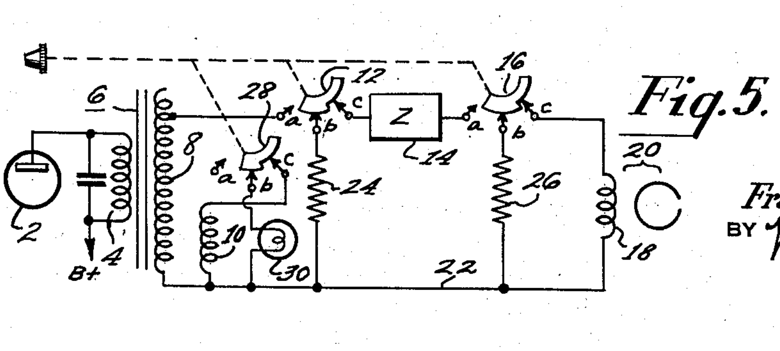

Although each step of the operation of the switches has been described and shown as separate and distinct steps, the operation of the device from the position shown in Figure 1 to the position shown in Figure 5 may be in one continuous motion and need cover a time interval no longer than that needed to turn a switch handle from the first position to the latter.

While a particular order of the closing of the third contacts of the several switches was described, this was solely for the purpose of illustration. The order is immaterial to the successful operation of the apparatus. It is important only, that they close sequentially to provide a step attenuation of head bias current.

When the arrangement constituting the present invention is used in apparatus such as a multipurpose motion picture apparatus as described in the aforesaid copending application, the switches herein described may be further ganged with other switches in the apparatus providing a single knob control unit to convert the apparatus completely from magnetic recording to optical playback and, thence, to magnetic playback.

By a careful selection of values for the several shunt load devices, a proper degree of attenuation may be obtained for the several steps. In one successfully operated model, constructed in accordance with the present invention, values were selected which gave an attenuation of 6,6 and 4 db, respectively for the successive steps. Although three steps of attenuation have been shown and described, the number of steps does not appear to be critical.

Thus, it may be seen that there has been provided an improved magnetic recording system which is characterized in that means are provided for deenergizing the magnetic recording head without danger of leaving the head permanently magnetized, and without turning off the source of high frequency current.

What is claimed is:

In a magnetic recording system, a magnetic recording head, a source of high frequency bias current, means for connecting said source to said head, and means for successively and increasingly attenuating the bias applied to said head from said source, said last mentioned means including a first load device, a second load device and a third load device, a first and second multi-position switch, said first and second switch being serially connected between said source and said head, said first switch being operable to connect said first load device in shunt with said head, said second switch being operable to connect said second load device in shunt with said head, and a third multi-position switch operable to connect said third load device in shunt with said head, said third load device comprising an exciter lamp, at least one of said switches being further operable to interrupt the circuit between said head and said source.

FRANZ L. PUTZRATH.

References Cited in the file of this patent

UNITED STATES PATENTS

| Number | Name | Date |
|---|---|---|
| 2,468,782 | De Ross | May 3, 1949 |